(12) United States Patent
Ashida et al.

(10) Patent No.: US 11,440,973 B2
(45) Date of Patent: Sep. 13, 2022

(54) CELLULOSE ACETATE, CELLULOSE ACETATE COMPOSITION, MOLDED ARTICLE, AND FILM

(71) Applicant: DAICEL CORPORATION, Osaka (JP)

(72) Inventors: Yuya Ashida, Himeji (JP); Ikuhiro Suzuki, Himeji (JP); Akihiro Higuchi, Himeji (JP)

(73) Assignee: DAICEL CORPORATION, Osaka (JP)

( * ) Notice: Subject to any disclaimer, the term of this patent is extended or adjusted under 35 U.S.C. 154(b) by 382 days.

(21) Appl. No.: 16/480,515

(22) PCT Filed: Jan. 17, 2018

(86) PCT No.: PCT/JP2018/001230
§ 371 (c)(1),
(2) Date: Jul. 24, 2019

(87) PCT Pub. No.: WO2018/139318
PCT Pub. Date: Aug. 2, 2018

(65) Prior Publication Data
US 2019/0389976 A1 Dec. 26, 2019

(30) Foreign Application Priority Data

Jan. 25, 2017 (JP) .............................. JP2017-011243

(51) Int. Cl.
*C08B 3/06* (2006.01)
*C08J 5/18* (2006.01)

(52) U.S. Cl.
CPC ..................... *C08B 3/06* (2013.01);
*C08J 5/18* (2013.01); *C08J 2301/12* (2013.01)

(58) Field of Classification Search
CPC . C08B 3/06; C08L 1/12; C08J 2301/12; C08J 5/18; C08J 2401/12
See application file for complete search history.

(56) References Cited

U.S. PATENT DOCUMENTS

| | | |
|---|---|---|
| 2007/0093655 A1 | 4/2007 | Oya |
| 2008/0194807 A1 | 8/2008 | Buchanan et al. |
| 2012/0172585 A1 | 7/2012 | Shimamoto et al. |

FOREIGN PATENT DOCUMENTS

| | | | |
|---|---|---|---|
| CA | 2283980 A1 | 9/1998 | |
| EP | 0590 401 A2 | 4/1994 | |
| EP | 2472296 A1 * | 7/2012 | ........... G02B 5/3083 |
| GB | 2489491 A | 10/2012 | |
| JP | 56-59801 A | 5/1981 | |
| JP | 9-77801 A | 3/1997 | |
| JP | 10-45801 A | 2/1998 | |
| JP | 10-45802 A | 2/1998 | |
| JP | 2000-511588 A | 9/2000 | |
| JP | 2007-138141 A | 6/2007 | |
| JP | 2008-56819 A | 3/2008 | |
| JP | 2012-25896 A | 2/2012 | |
| TW | 201137013 A1 | 11/2011 | |
| WO | WO 03/062314 A1 | 7/2003 | |
| WO | WO-2017061474 A1 * | 4/2017 | ............... C08B 3/06 |

OTHER PUBLICATIONS

Saka, et al., 2.3 Wood Pulp Manufacturing and Quality Characteristics, 2004, Macromol. Symp. vol. 208, pp. 37-48 (Year: 2004).*
Lakna, Difference Between Cellulose and Hemicellulose [online], Pediaa.com. [retrieved on Oct. 26, 2021]. Retrieved from the internet. <URL: https://pediaa.com/difference-between-cellulose-and-hemicellulose/ > (Year: 2018).*
Machine translation of WO 2017061474 A1 originally published Apr. 2017 to Kuwana et al. (Year: 2017).*
Chen et al., Isolation and Characterization of Acetone-Insoluble Substances in Cellulose Acetate Prepared By An Acetic Acid Acetylation Process, 2014, Cellulose Chemistry and Technology, vol. 48, pp. 477-483 (Year: 2014).*
International Search Report for International Application No. PCT/JP2018/001230, dated Mar. 20, 2018.
Steinmeier, "3. Acetate Manufacturing, Process and Technology, 3.1 Chemistry of Cellulose Acetylation," Macromol. Symp., vol. 208, 2004, pp. 49-60.
Written Opinion of the International Searching Authority for International Application No. PCT/JP2018/001230, dated Mar. 20, 2018.
Extended European Search Report dated Aug. 24, 2020, in European Patent Application No. 18745054.9.

* cited by examiner

*Primary Examiner* — Stefanie J Cohen
*Assistant Examiner* — Ritu S Shirali
(74) *Attorney, Agent, or Firm* — Birch, Stewart, Kolasch & Birch, LLP

(57) ABSTRACT

The purpose of the present invention is to provide cellulose acetate with which it is possible to obtain a molded article containing cellulose acetate having a small amount of lumps. The cellulose acetate has an acetylation degree of 52% or more and 59% or less, and an acetone-insoluble substance content of 0.04 wt % or less.

5 Claims, No Drawings

CELLULOSE ACETATE, CELLULOSE ACETATE COMPOSITION, MOLDED ARTICLE, AND FILM

TECHNICAL FIELD

The present invention relates to cellulose acetate, a cellulose acetate composition, a molded article, and a film.

BACKGROUND ART

Cellulose acetate is one of organic acid esters of cellulose, which are cellulose derivatives, and cellulose acetate is used in a wide range of applications such as clothing fibers, tobacco filter chips, plastics, films, coating materials, pharmaceuticals, foods, cosmetics and construction. Among cellulose derivatives, cellulose acetate is produced in large quantities, and is industrially important.

In particular, cellulose acetate having an acetylation degree of about 52% or more and 59% or less, which is referred to as cellulose diacetate, has various features such as excellent transparency; property of being freely colored; excellent luster and glossiness; impact resistance; such high stiffness that cracking hardly occurs even when metal is inserted; excellent gasoline resistance and extraordinarily high oil resistance; such low electrostatic property that dust is hardly deposited; favorable touch and feeling; and ease of secondary processing such as cutting. The cellulose acetate is used particularly as a material touching the skin of the human, and molded by thermoplastic molding such as extrusion molding and subsequent cutting processing as well as vacuum/pressure molding or the like.

Typical methods for production of cellulose acetate on an industrial scale includes a so-called acetic acid method in which acetic anhydride is used as an acetylating agent, acetic acid is used as a diluent, and sulfuric acid is used as a catalyst. The acetic acid method includes, as essential steps, (1) a pretreatment step of disintegrating and cracking a pulp raw material (dissolved pulp) with a relatively high α-cellulose content, then spraying acetic acid and mixing the mixture; (2) an acetylating step of reacting the pretreated pulp in the step (1) with a mixed acid including acetic anhydride, acetic acid and an acetylating catalyst (e.g. sulfuric acid); (3) an aging step of hydrolyzing cellulose acetate to obtain cellulose acetate having a desired acetylation degree; and (4) a posttreatment step of precipitating the cellulose acetate after completion of the hydrolysis reaction, separating the cellulose acetate from the reaction solution, and purifying, stabilizing and drying the cellulose acetate (PTL 1 and NPL 1).

Various molded articles such as films, which are obtained by performing molding using, as a raw material, cellulose acetate produced by the above-mentioned method often include various kinds of foreign matter in a small amount, and thus, although other required properties are satisfied, their commercial value is significantly reduced.

For this reason, methods have been developed for obtaining cellulose acetate having a reduced amount of foreign matter. Examples of the methods include a method in which a cellulose-mixed fatty acid ester is dissolved in an organic solvent, the solution is filtered, and the filtrate is then dried by vaporization of the organic solvent to obtain a cellulose-mixed fatty acid ester having a small amount of bright spot foreign matter (PTL 2); a method in which cellulose is acylated using an esterification agent containing an excess amount of an acid anhydride with respect to hydroxyl groups of cellulose, and a terminator containing water is then mixed with the reaction mixture while the temperature of the reaction mixture is controlled to −30 to 35° C., whereby the acid anhydride is hydrolyzed to reduce the amount of very small foreign matter (PTL 3); and a method in which a cellulose ester solution and an alcohol are mixed, and a cellulose ester is then precipitated with a poor solvent to reduce the amount of gel-like foreign matter (PTL 4).

PTL 2 suggests that the bright spot foreign matter is a foreign matter which appears as a bright spot with light leaked at a foreign matter part when a cellulose ester film is placed between two polarizers arranged in such a manner as to orthogonally cross each other (cross-nicol arrangement), light is applied from outside one polarizer, and the cellulose acetate film is observed from outside the other polarizer with a microscope. PTL 3 suggests that the very small foreign matter has a diameter of 1 μm or more and less than 10 μm, and is observed with a polarization microscope in a cross-nicol state. PTL 4 suggests that the "gel-like foreign matter" is foreign matter such that when two polarization plates are disposed in a cross-nicol state, an optical film is placed between the polarization plates, fight is applied from the side done polarization plate, and the film is observed from the side of the other polarization plate, light is not leaked from the opposite side, but the foreign matter is observed as irregularities on a film surface, and the foreign matter is shapeless when observed with a transmission microscope.

In recent years, cellulose acetate which is a material of molded articles to be used for fashion brands have been required to have high quality due to, for example, pursuant of a fashion property taking advantage of more excellent glossiness and higher transparency, and cellulose acetate having a sufficiently reduced amount of foreign matter is has been desired. As described above, the techniques described in PTLs 2 to 4 are intended to reduce the amount of bright spot foreign matter or gel-like foreign matter which is very small foreign matter required to be observed in a cross-nicol state and with a microscope, but those techniques are not capable of sufficiently reducing the amount of foreign matter observable with naked eyes (hereinafter, sometimes referred to as lumps), which may be generated in thermoplastic molding of cellulose acetate with a plasticizer blended with the cellulose acetate.

CITATION LIST

Patent Literature

PTL 1: Japanese Patent Application Laid-Open Publication No. 56-059801
PTL 2: Japanese Patent Laid-Open Publication No. 2008-056819
PTL 3: Japanese Patent Laid-Open Publication No. 2007-138141
PTL 4: Japanese Patent Laid-Open Publication No. 2012-025896

Non Patent Literature

NPL 1: Macromol. Symp. 2004, 208, 49-60

SUMMARY OF INVENTION

Technical Problem

A main object of the present invention is to provide cellulose acetate with which it is possible to obtain a molded article containing cellulose acetate having a small amount of lumps.

Solution to Problem

For solving the above-mentioned problem, the present inventors have extensively conducted studies. As a result, the present inventors have found that unexpectedly, when the acetone-insoluble substance content in cellulose acetate is 0.04 wt % or less, cellulose acetate capable of providing a high-quality molded article having an extremely small amount of lumps can be obtained, leading to completion of the present invention. That is, the present invention is as follows.

(1) Cellulose acetate has an acetylation degree of 52% or more and 59% or less, and an acetone-insoluble substance content of 0.04 wt % or less.

(2) In the cellulose acetate according to (1), a viscosity at 6% is 30 mPa·s or more and 200 mPa·s or less.

(3) The cellulose acetate according to (1) or (2) is cellulose acetate in which a ratio of a molar content of glucose to a sum of the molar contents of glucose, xylose and mannose is 97% or more in sugar composition analysis.

(4) A cellulose acetate composition includes the cellulose acetate according to any one of (1) to (3) and a plasticizer.

(5) A molded article includes the cellulose acetate according to any one of (1) to (3).

(6) A film includes the cellulose acetate according to any one of (1) to (3).

Advantageous Effects of Invention

According to the present invention, it is possible to provide cellulose acetate with which it is possible to obtain a molded article containing cellulose acetate having a small amount of lumps.

DESCRIPTION OF EMBODIMENTS

Hereinafter, an example of a preferred embodiment will be described in detail.

The cellulose acetate of the present disclosure has an acetylation degree of 52% or more and 59% or less, and an acetone-insoluble substance content of 0.04 wt % or less.

[Acetylation Degree]

The acetylation degree of the cellulose acetate of the present disclosure is 52% or more and 59% or less, and the lower limit of the acetylation degree is preferably 53% or more, more preferably 53.7% or more, still more preferably 54% or more. When the acetylation degree is less than 52%, the dimensional stability, moisture resistance, heat resistance or the like of a molded article containing cellulose acetate is reduced. On the other hand, the upper limit of the acetylation degree is preferably 57% or less, more preferably 56% or less, still more preferably 55.5% or less. When the acetylation degree is more than 59%, a molded article containing cellulose acetate is excellent in strength, but becomes brittle, and for example, when the molded article is used as a molded product such as a fiber material for clothing or the like, or a frame of glasses, sunglasses or the like, addition of a plasticizer in a large amount for obtaining softness such as a suitable elongation increases the possibility of causing bleed-out.

Here, the acetylation degree in the present invention means the amount of bonded acetic acid per cellulose unit weight of cellulose. The acetylation degree follows the measurement and calculation of an acetylation degree in ASTM: D-817-91 (Method for Testing Cellulose Acetate and Others).

The acetylation degree determined in accordance with the measurement method described above can be converted into an acetyl substitution degree using the following equations. This is the most common method for determining the substitution degree of cellulose acetate. According to the following equation, for example, an acetylation degree of 52% corresponds to an acetyl substitution degree of 2.21, and an acetylation degree of 59% corresponds to an acetyl substitution degree of 2.71.

$$DS=162.14 \times AV \times 0.01/(60.052-42.037 \times AV \times 0.01)$$

DS: acetyl substitution degree
AV: acetylation degree (%)

[Acetone-Insoluble Substance Content]

The cellulose acetate of the present disclosure has an acetone-insoluble substance content of 0.04 wt % or less, and the upper limit of the acetone-insoluble substance content is preferably 0.03 wt % or less, more preferably 0.02 wt % or less, still more preferably 0.01 wt % or less. It is not preferable that the acetone-insoluble substance content is more than 0.04 wt % because the amount of lumps rapidly increases. Further, when the acetone-insoluble substance content excessively increases, a glass filter may be clogged at the time of measurement, thus making it impossible to perform measurement. The lower limit of acetone-insoluble substance content is preferably smaller, and is not particularly limited, but may be, for example, 0.001 wt % or more from the viewpoint of production cost.

The acetone-insoluble substance content can be, determined by the following method. A solution obtained by dissolving cellulose acetate in acetone at a solid concentration of 3 wt % is subjected to suction filtration at room temperature (25° C.) under a reduced pressure of 30 mmHg using a glass filter. As the glass filter, 1G-4 (pore diameter: 5 to 10 μm) manufactured by SOGO LABORATORY GLASS WORKS CO., LTD can be used. Thereafter, a dope adhering to the filtration residue is washed away with acetone. The filtration residue is dried together with the glass filter to constant weight. The weight of the glass filter is measured before and after filtration, and the acetone-insoluble substance content is calculated from the following equation.

acetone-insoluble substance content (wt %)=[weight of glass filter after filtration (g)−weight of filter before filtration (g)]/weight of cellulose acetate (g)×100

[Viscosity at 6%]

The viscosity at 6% of the cellulose acetate of the present disclosure is preferably 30 mPa·s or more and 200 mPa·s or less. The lower limit of the viscosity at 6% is more preferably 40 mPa·s or more, still more preferably 50 mPa·s or more, most preferably 60 mPa·s or more. When the viscosity at 6% is less than 30 mPa·s, the possibility increases that flowability in injection molding for obtaining a molded article is excessively high, leading to occurrence of leakage from a mold increases. On the other hand, the upper limit of the viscosity at 6% is more preferably 180 mPa·s or less, still more preferably 160 mPa·s or less, most preferably 140 mPa·s or less. When the viscosity at 6% is more than 200 mPa·s, flowability in injection molding for obtaining a molded article may be low, leading to deterioration of surface flatness of the molded article.

The viscosity at 6% can be adjusted by appropriately controlling the reaction time, the catalyst amount, the reaction temperature and the reaction concentration in the later-described acetylation step and saponification step in production of cellulose acetate.

Here, the viscosity at 6% is determined by dissolving cellulose acetate in a 95% acetone aqueous solution at a concentration of 6 wt/vol %, and measuring the fluidization time using an Ostwald viscometer.

[Ratio of Constituent Sugars]

In the cellulose acetate of the present disclosure, the ratio of the molar content of glucose to the sum of the molar contents of glucose, xylose and mannose is preferably 97% or more, more preferably 97.5% or more, still more preferably 98.0% or more, most preferably 98.5% or more in sugar composition analysis. It is not preferable that the ratio of the molar content of glucose to the sum of the molar contents of glucose, xylose and mannose is less than 97% cause the acetone-insoluble substance content tends to increase, leading to an increase in the amount of lumps.

The ratio of the molar content of glucose to the sum of the molar contents of glucose, xylose and mannose in sugar composition analysis can be determined by the following method.

Cellulose acetate is hydrolyzed with sulfuric acid, neutralized with barium carbonate, and filtered through a filter paper and an ion exchange filter, the molar contents of glucose, xylose and glucose are calculated from data obtained by HPLC-CAD among high performance liquid chromatography (HPLC) methods, and the ratio of the molar content of glucose to the sum of the molar contents of glucose, xylose and mannose is determined.

[Haze]

The haze of the cellulose acetate of the present disclosure is preferably 10 or less, more preferably 8 or less, still more preferably 5 or less, most preferably 4 or less. The haze becomes lower as the acetone-insoluble substance content decreases. In addition, the transparency of the molded product is enhanced as the haze becomes lower.

The haze can be measured in accordance with the method in JIS K7105 (Method for Testing Optical Properties of Plastics).

[Lumps]

The term "lumps" in the present disclosure refers to foreign matter which is visible to the naked eye and may be generated in thermoplastic molding of cellulose acetate with a plasticizer blended with the cellulose acetate. The lumps may be generated when cellulose acetate is not sufficiently compatible with a plasticizer, and thus the ratio of the plasticizer is lower as compared to portions other than the lumps, or there is no plasticizer.

[Production of Cellulose Acetate]

A method for producing the cellulose acetate will be described in detail. A preferred method for producing cellulose acetate according to the present disclosure includes the following series of steps: activation step (i) of pretreating and activating cellulose raw material by adding acetic acid or acetic acid containing 1 to 10% by weight of sulfuric acid (sulfur-containing acetic acid) to the cellulose raw material in one step or two steps; acetylation step (ii) of acetylating the pretreated and activated cellulose in the presence of a sulfuric acid catalyst; saponification and aging step (iii) of partially neutralizing the sulfuric acid catalyst and performing aging in the presence of the sulfuric acid catalyst (or remaining sulfuric acid); purification and drying treatment (iv); grinding step (v); and step (vi) of reducing the content of acetone-insoluble substances contained in cellulose acetate. In the production method, in particular, purification and drying treatment (iv) is an optional step, and whether the step is carried out or not can be determined as appropriate. For a general method for producing a cellulose acetate, reference can be made to "Wood Chemistry" (Vol. 1) (Migita et al., Kyoritsu Publishing Co., Ltd., published in 1968, p.p. 180-190).

(Cellulose Raw Material)

As cellulose (pulp) to be used as a raw material of the cellulose acetate of the present disclosure, wood pulp (softwood pulp or hardwood pulp), cotton linter or the like can be used. These celluloses may be used singly or in combination of two or more thereof, and for example, softwood pulp and cotton linter or hardwood pulp may be used in combination.

Linter pulp will be described. Linter pulp is preferable because it has a high cellulose purity and a small amount of coloring components, and a molded product has high transparency.

Wood pulp will now be described. Wood pulp is preferable because it can be stably supplied as a raw material, and is more advantageous in terms of cost as compared to a linter. Examples of the wood pulp include hardwood pre-hydrolyzed kraft pulp. Further, as wood pulp, crushed pulp obtained by crushing hardwood pre-hydrolyzed kraft pulp or the like into a cotton shape can be used. Crushing can be performed using, for example, a disc refiner.

Further, the a cellulose content of the cellulose raw material is preferably 90% by weight or more, more preferably 92% by weight or more, still more preferably 95% by weight or more, most preferably 97% by weight or more. This is because the amount of insoluble residues is reduced to prevent impairment of the transparency of a molded article, and it is easy to obtain cellulose acetate in which the ratio of the molar content of glucose to the sum of the molar contents of glucose, xylose and mannose is 97% or more in sugar composition analysis.

When cellulose raw material is difficult to handle because it is supplied in the form of a sheet, etc., it is preferable to pass through a step of subjecting the cellulose raw material to grinding treatment in a dry process.

(Activation Step (i))

In activation step (i) of pretreating and activating the cellulose raw material by adding acetic acid or acetic acid containing 1 to 10% by weight of sulfuric acid (sulfur-containing acetic acid) to the cellulose raw material, the acetic acid and/or sulfur containing acetic acid can be added in an amount of preferably 10 to 500 parts by weight based on 100 parts by weight of the cellulose raw material. The method for adding acetic acid and/or sulfur-containing acetic acid to cellulose may be, for example, a method in which acetic acid or sulfur-containing acetic acid is added in once, or a method in which acetic acid or sulfur-containing acetic acid is added in twice or more. Examples of the method in which acetic acid or sulfur-containing acetic acid is added in twice or more include a method in which sulfur-containing acetic acid is added after elapse of a certain amount of time after addition of acetic acid, and a method in which acetic acid is added after elapse of a certain amount of time after addition of sulfur-containing acetic acid. The specific addition means may be, for example, a method in which acetic acid or sulfur-containing acetic acid is sprayed, and the mixture is stirred.

Pretreatment and activation can be carried out by, for example, adding acetic acid and/or sulfur-containing acetic acid to cellulose, and then leaving the mixture standing at 17 to 40° C. for 0.2 to 48 hours, or sealing and stirring the mixture at 17 to 40° C. for 0.1 to 24 hours.

(Acetylation Step (ii))

In acetylation step (ii) of acetylating the pretreated and activated cellulose in the presence of a sulfuric acid catalyst, acetylation can be started by, for example, adding pretreated and activated cellulose to a mixture containing acetic acid, acetic anhydride and sulfuric acid, or adding a mixture of acetic acid and acetic anhydride and sulfuric acid to pretreated and activated cellulose.

In addition, the ratio of acetic acid and acetic anhydride is not particularly limited as long as the mixture contains acetic acid and acetic anhydride, the amount of acetic anhydride is preferably 200 to 400 parts by weight based on 300 to 600 parts by weight of acetic acid, more preferably 240 to 280 parts by weight based on 350 to 530 parts by weight of acetic acid.

As a ratio of cellulose, a mixture of acetic acid and acetic anhydride, and sulfuric acid in the acetylation reaction, the amount of the mixture of acetic acid and acetic anhydride is preferably 500 to 1,000 parts by weight, the amount of the concentrated sulfuric acid is preferably 5 to 15 parts by weight, more preferably 7 to 13 parts by weight, still more preferably 8 to 11 parts by weight based on 100 parts by weight of cellulose.

In acetylation step (ii), the acetylation reaction of cellulose can be carried out by performing stirring at 20 to 55° C. for 30 minutes to 36 hours from the start of acetylation.

In addition, the acetylation reaction of cellulose can be carried out under, for example, stirring conditions with the temperature elevated to 20 to 55° C. over 5 minutes to 36 hours from the start of acetylation, or the acetylation reaction can be carried out under stirring conditions without applying heat to the inside and outside of the reaction system from outside. In the early stage of the acetylation reaction, a reaction in a solid-liquid heterogeneous system proceeds, and it is preferable to spend as much time as possible on elevating the temperature for reducing the amount of unreacted substances by causing the acetylation reaction to proceed while suppressing a depolymerization reaction, but from the viewpoint of productivity, it is preferable to elevate the temperature over 2 hours or less, more preferably 1 hour or less.

The time taken for the acetylation reaction (hereinafter, also referred to as an acetylation time) is preferably 30 to 200 minutes. Here, the acetylation time is a time until a neutralizing agent is added after a time point at which cellulose raw material is added in the reaction system to start reacting with acetic anhydride.

(Saponification and Aging Step (iii))

In saponification and aging step (iii) of partially neutralizing the sulfuric acid catalyst, and performing aging in the presence of the sulfuric acid catalyst (or remaining sulfuric acid), sulfuric acid is bonded to cellulose as a sulfuric acid ester by the acetylation reaction, and therefore the sulfuric acid ester is saponified and removed for improving thermal stability after completion of the acetylation reaction. In saponification and aging, a neutralizing agent such as water, dilute acetic acid or a magnesium acetate aqueous solution is added for stopping the acetylation reaction. When water is added, the water reacts with acetic anhydride present in a reaction mixture containing cellulose acetate, so that acetic acid is generated, and the neutralizing agent can be added in such a manner that the reaction mixture containing cellulose acetate after the saponification and aging step has a moisture content of 5 to 70 mol % based on the amount of acetic acid. When the moisture content is less than 5 mol %, the saponification reaction does not proceed, and depolymerization proceeds, resulting in production of a low-viscosity cellulose acetate, and when the moisture content is more than 70 mol %, the cellulose ester (cellulose triacetate) after completion of the acetylation reaction is precipitated, and leaves the saponification and aging reaction system, so that the saponification reaction of the precipitated cellulose ester no longer proceeds.

Here, dilute acetic acid is a 1 to 50 wt % acetic acid aqueous solution. In addition, the magnesium acetate concentration of the magnesium acetate aqueous solution is preferably 5 to 30% by weight The reaction mixture containing cellulose acetate is any mixture containing cellulose acetate in each step until cellulose acetate is obtained.

In addition, when the sulfate ion concentration in the reaction mixture containing cellulose acetate is high, the sulfuric acid ester cannot be efficiently removed, and therefore it is preferable to reduce the sulfate ion concentration by adding an aqueous solution of an alkaline earth metal salt of acetic acid such as magnesium acetate or an acetic acid-water mixed solution to form an insoluble sulfuric acid salt. Preferably, the amount of sulfate ions in the reaction mixture containing cellulose acetate is adjusted to 1 to 6 parts by weight based on 100 parts by weight of cellulose acetate (cellulose equivalent). For example, by adding an acetic acid-water mixed solution of magnesium acetate to the reaction mixture containing cellulose acetate, the acetylation reaction can be stopped concurrently with reducing the weight ratio of sulfate ions to 100 parts by weight of cellulose acetate (cellulose equivalent).

The time of saponification and aging (hereinafter, also referred to as an "aging time") is not particularly limited, but for example, it is preferably 100 to 300 minutes when the acetylation degree is adjusted to 52% or more and 59% or less, and for obtaining a desired acetylation degree, the time may be appropriately adjusted. Here, the aging time is a time until the saponification reaction is stopped after the start of adding a neutralizing agent In addition, saponification and aging is performed by holding the product for 20 to 120 minutes at an aging temperature of preferably 50 to 100° C., especially preferably 70 to 90° C. Here, the aging temperature is a temperature in the reaction system in the aging time.

In the saponification and aging step, the entire reaction system can be kept at a uniform and appropriate temperature by utilizing reaction heat of water and acetic anhydride, so that generation of a product having an excessively high or low acetylation degree is prevented.

(Purification and Drying Treatment (iv))

In purification and drying treatment (iv), purification can be performed by mixing a mixture containing cellulose acetate and a precipitating agent such as water, dilute acetic acid or a magnesium acetate aqueous solution, separating the generated cellulose acetate (precipitate) to obtain the precipitate, and removing free metal components, sulfuric acid components and the like by washing with water. Here, water or dilute acetic acid is preferable as a precipitating agent to be used for obtaining a precipitate of cellulose acetate. This is because a sulfuric acid salt in the reaction mixture containing cellulose acetate is dissolved, and the sulfuric acid salt in cellulose acetate, which is obtained as a precipitate, is easily removed.

In particular, in addition to washing with water, an alkali metal compound and/or an alkaline earth metal compound, particularly a calcium compounds such as calcium hydroxide, may be added as a stabilizer if necessary for improving thermal stability of cellulose acetate after the aging reaction (after complete neutralization). In addition, a stabilizer may be used in washing with water.

Examples of the specific method for mixing a precipitating agent with a reaction mixture containing cellulose acetate include a method in which a reaction mixture containing cellulose acetate and a precipitating agent are stirred using a commercial mixer, and a method in which a precipitating agent is added to a reaction mixture containing cellulose acetate, and the mixture is kneaded using a twin-screw kneader. For example, in the case of a method for stirring using a commercial mixer, a reaction mixture containing cellulose acetate and a precipitating agent in an amount necessary for precipitating cellulose acetate are mixed at one time and stirred. In the case of a method including kneading the mixture using a twin-screw kneader, the precipitating agent can be added in several portions to the reaction mixture containing cellulose acetate, but it is preferable that the precipitating agent in an amount 0.5 to 2 times the amount of the reaction mixture containing cellulose acetate is added at one time immediately before a precipitation point is exceeded.

Preferably, separation of cellulose acetate (precipitate) is performed by filtration, centrifugation or the like after the precipitating agent is mixed.

The method for drying in purification and drying treatment (iv) is not particularly limited, and a known method can be used. For example, drying can be performed under conditions of air blowing, reduction of pressure and the like. As a drying method may be, for example, hot air drying.

The method for drying in purification and drying treatment (iv) is not particularly limited, and a known method can be used. For example, drying can be performed under conditions of air blowing, reduction of pressure and the like. As a drying method may be, for example, hot air drying.

(Grinding Step (v))

The method for grinding a cellulose acetate precipitate in grinding step (v) is not limited. For grinding, a conventional grinder, such as a sample mill, a hammer mill, a turbo mill, an atomizer, a cutter mill, a bead mill, a ball mill, a roll mill, a jet mill, a pin mill or the like can be used. Alternatively, freeze grinding, dry grinding at normal temperature, or wet grinding may be performed. In particular, it is preferable to use a hammer mill or a turbo mill because it is excellent in grinding ability.

(Step (vi) of Reducing Content of Acetone-Insoluble Substances)

It is difficult to obtain cellulose acetate having an acetone-insoluble substance content of 0.04 wt % or less by a general method for producing cellulose acetate, and such cellulose acetate can be obtained by passing through step (vi) of reducing the content of acetone-insoluble substances in cellulose acetate.

The method which can be employed in step (vi) of reducing the acetone-insoluble substance content contained in cellulose acetate is not particularly limited as long as the acetone-insoluble substance content can be set to 0.04 wt %, and examples thereof include a method in which cellulose acetate is dissolved in a solvent, filtration treatment is performed, and cellulose acetate is then taken as a precipitate from the filtrate (precipitation treatment). The cellulose acetate subjected to step (vi) of reducing the amount of low-molecular-weight components contained in cellulose acetate may be any of various forms, for example a powder form, a particulate form, fibrous form and flake form.

The solvent is not particularly limited as long as cellulose acetate is soluble in the solvent, but acetone, dichloromethane, acetic acid, or dimethylformamide which allows the content of acetone-insoluble substances to be easily reduced by filtration is preferable, acetone or dichloromethane is more preferable, and acetone is still more preferable.

The filter to be used for filtration treatment is not limited as long as it can reduce the content of acetone-insoluble substances, and it is possible to use, for example, a glass filter; a filter cloth [calico (specification: #4000) manufactured by OMI ORIMONO CO., LTD., raising flannel (specification: vertical No. 20 count, horizontal No. 10 count, 60 yarns, 120 punches) manufactured by Toyo Senshoku Kogyo K. K., or the like]; a filter paper, a sintered metal [BEKIPOR manufactured by Kansai Wire Netting Co., Ltd.] or the like.

In addition, for efficiently removing acetone-insoluble substances, the filtration particle size of the filter is preferably 1 to 100 µm, more preferably 3 to 50 µm, still more preferably 5 to 20 µm. The filtration particle size can be measured in accordance with ASTM E128-61.

The precipitation treatment can be performed by adding a poor solvent for cellulose acetate poor to the filtrate. The poor solvent is preferably water or alcohol, more preferably water.

[Molded Article]

The molded article containing the cellulose acetate of the present disclosure is obtained by molding the cellulose acetate of the present disclosure. Examples of the molding method include injection molding, extrusion molding, vacuum molding, profile molding foam molding, injection press, press molding, blow molding and gas injection molding.

The shape of the molded article is not particularly limited, and may be, for example, a pellet shape, a film shape, a sheet shape, a fiber shape or the like. These shapes are suitable fields of OA/home electric appliances, electric and electronic fields, fields of communication devices, fields of transportation vehicles such as automobiles, fields of housings and associated products such as furniture and building materials, fields of miscellaneous goods, and the like.

The molded article containing the cellulose acetate of the present disclosure may be produced by molding using a cellulose acetate composition to which a plasticizer is adsorbed by mixing the cellulose acetate of the present disclosure with the plasticizer, and drying the mixture. Specifically, the method may be, for example, a method in which cellulose acetate to which a plasticizer is adsorbed is kneaded by an extruder such as a single-screw or twin-screw extruder to be molded into pellets; and a method in which cellulose acetate to which a plasticizer is adsorbed is melted and kneaded by a heating mil or a kneader such as a Banbury mixer to be molded. In addition, after the cellulose acetate is molded into pellets, the pellets may be remelted and molded into a film or the like using, for example, a single-screw or twin-screw extruder equipped with a T-die.

When a plasticizer is mixed with the cellulose acetate of the present disclosure to obtain a cellulose acetate composition, the cellulose acetate and the plasticizer can be mixed by a mixer such as a planetary mill, a Henschel mixer, a vibration mill or a ball mill. It is preferable to use a Henschel mixer because mixing and dispersion can be performed homogeneously in a short time. In addition, the degree of mixing is not particularly limited, but, for example, in the case of a Henschel mixer, it is preferable to perform mixing for 10 minutes to 1 hour.

In addition, drying can be performed after the cellulose acetate and the plasticizer are mixed. As a drying method may be, for example, a method in which the mixture is left standing and dried at 50 to 105° C. for 1 to 48 hours.

Examples of the plasticizer may include: aromatic carboxylic acid esters [phthalic acid di-C1-12 alkyl esters such as dimethyl phthalate, diethyl phthalate, dibutyl phthalate, dihexyl phthalate, dioctyl phthalate and di-2-ethylhexyl phthalate; phthalic acid C1-6 alkoxy C1-12 alkyl esters such as dimethoxyethyl phthalate; phthalic acid C1-12 alkyl/aryl-c1-3 alkyl esters such as butylbenzyl phthalate; C1-6 alkyl phthalyl C2-4 alkylene glycolates such as ethyl phthalyl ethylene glycolate and butyl phthalyl butylene glycolate; trimellitic acid tri-C1-12 alkyl esters such as trimethyl trimellilate, triethyl trimellitate, trioctyl trimellitate and tri-2-ethylhexyl trimellitate; pyromellitic acid tetra-C1-12 alkyl esters such as tetraoctyl pyromellitate; and the like]; phosphoric acid esters [tributyl phosphate, tricresyl phosphate, triphenyl phosphate and the like]; fatty acid esters [adipic acid esters such as dibutyl adipate, dioctyl adipate, butoxyethoxyethyl benzyl adipate and dibutoxyethoxyethyl adipate; azelaic acid esters such as diethyl azelate, dibutyl azelate and dioctyl azelate; sebacic acid esters such as dibutyl sebacate and dioctyl sebacate; butyl oleate; methylacetyl ricinoleate; and the like]; lower fatty acid esters of polyhydric alcohols (glycerin, trimethylolpropane, pentaerythritol, sorbitol and the like) [triacetin; diglycerin tetraacetate; and the like]; glycol esters (dipropylene glycol dibenzoate); citric acid esters [acetyltributyl citrate and the like]; amides [N-butyl benzene sulfonamide and the like]; and ester oligomers (caprolactone oligomers and the like). These plasticizers may be used singly or in combination of two or more thereof.

It is preferable to use diethyl phthalate, triphenyl phosphate or triacetin, among the above-mentioned plasticizers, because it has high compatibility with cellulose acetate.

Even when about 40 parts by weight of these plasticizers are added based on 100 parts by weight of the cellulose acetate according to the present disclosure, deterioration of adaptability to a molded article production process hardly occurs. Deterioration of adaptability to a molded article production process is caused by, for example, occurrence of bridging in a hopper when cellulose acetate containing a plasticizer is fed to an extruder using a hopper in a process for producing a molded article of cellulose acetate. The amount of the plasticizer added is preferably 20 to 40 parts by weight, more preferably 25 to 38 parts by weight, still more preferably 28 to 36 parts by weight based on 100 parts by weight of the cellulose acetate according to the present disclosure. When the amount of the plasticizer added is less than 20 parts by weight, lumps (spot-like specks) are easily generated in the molded article, and when the amount of the plasticizer added is more than 40 parts by weight, the bending strength of the molded body is reduced.

At the time of mixing cellulose acetate and a plasticizer, for example, other additives (antioxidants, ultraviolet absorbers, heat stabilizers, light stabilizers and the like); colorants (dyes, pigments and the like); antistatic agents; flame retardant auxiliaries; lubricants; anti-blocking agents; dispersants; fluidizing agents; anti-dripping agents; antibacterial agents; and the like may be added as common additives according to the use and specification of a molded article. In addition, other cellulose esters (for example, organic acid esters such as cellulose propionate and cellulose butyrate, or inorganic acid esters such as cellulose nitrate, cellulose sulfate and cellulose phosphate), other polymers and the like may be used in combination.

EXAMPLES

Hereinafter, the present invention will be described in detail by way of examples, but the technical scope of the present invention is not limited to these examples.

Physical properties as described in the examples below were evaluated by the following methods.

<Acetylation Degree>

The acetylation degree of cellulose acetate was determined by the method for measuring an acetylation degree in ASTM-D-817-91 (Method for Testing Cellulose Acetate and Others). 1.9 g of dried cellulose acetate was precisely weighed, and dissolved in 150 ml of a mixed solvent of acetone and dimethyl sulfoxide (volume ratio 4:1), 30 ml of a 1N sodium hydroxide aqueous solution was added, and the mixture was saponified at 25° C. for 2 hours. Phenolphthalein was added as an indicator, and excess sodium hydroxide was titrated with 1N sulfuric acid (concentration factor: F). In addition, a blank test was conducted in the same manner as described above, and the acetylation degree was calculated in accordance with the following equation.

$$\text{acetylation degree } (\%) = [6.5 \times (B-A) \times F]/W$$

where A represents a titer of 1N sulfuric acid in the sample (ml), B represents a titer of 1N sulfuric acid in the blank test (ml), F represents a concentration factor of 1N sulfuric acid, and W represents a weight of the sample.

<Acetone-Insoluble Substance Content>

10.0 g of dried cellulose acetate was precisely weighed, and dissolved in 322.0 g of acetone at 25° C., and the solution was subjected to suction filtration at room temperature (25° C.) under a reduced pressure of 30 mmHg using a glass filter (pore diameter. 5 to 10 μm, 1G-4 manufactured by SOGO LABORATORY GLASS WORKS CO., LTD). Thereafter, a dope adhering to the filtration residue was washed away with 200 mL of acetone. The filtration residue was dried together with the glass filter to constant weight. The weight of the glass filter was measured before and after filtration, and the acetone-insoluble substance content was calculated from the following equation.

acetone-insoluble substance content (wt %)=[weight of glass filter after filtration (g)−weight of filter before filtration (g)]/weight of cellulose acetate (g)×100

<Viscosity at 6%>

The viscosity at 6% of cellulose acetate was measured by the following method. In an Erlenmeyer flask, 3.00 g of a dried sample and 39.90 g of a 95% acetone aqueous solution were added, the flask was tightly stoppered, and the mixture was stirred for about 1.5 hours. Thereafter, the flask was shaken for about 1 hour by a rotary shaker to completely dissolve the sample. The resulting 6 wt/vol % solution was transferred to a predetermined Ostwald viscometer up to a marked line, and thermally conditioned at 25±1° C. for about 15 minutes. The time during which the solution flew down between the clocking marked lines was measured, and the viscosity at 6% was calculated from the following equation (1).

$$\text{viscosity at 6\% (mPa·s)} = \text{flow-down time (s)} \times \text{viscometer coefficient} \quad (1)$$

Using a standard solution for viscometer calibration (manufactured by Showa Oil Co., Ltd., trade name "JS-200" (conforming to JIS Z 8809)), the flow-down time was measured by the same operation as described above, and the viscometer coefficient was determined from the following equation (2).

$$\text{viscometer coefficient} = \{\text{standard solution absolute viscosity (mPa·s)} \times \text{solution density } (0.827 \text{ g/cm}^3)\} / \{\text{standard solution density (g/cm}^3) \times \text{standard solution flow-time (seconds) (s)} \quad (2)$$

<Sugar Composition Analysis>

Cellulose acetate was hydrolyzed with sulfuric acid, neutralized with barium carbonate, and filtered through a filter paper and an ion exchange filter, the molar contents of glucose, xylose and glucose were calculated using data obtained by HPLC-CAD (Agilent 1200 Series System) among high performance liquid chromatography (HPLC) methods, and the ratio of the molar content of glucose to the sum of the molar contents of glucose, xylose and mannose was determined.

The HPLC measurement conditions are as follows.
Column: Asahipak NH2P-50 4E (4.6 mm I.D.×250 mm)
Guard column: Asahipak NH2P-50G 4A (4.6 mm I.D.×10 mm)
Column temperature: 20° C.
Mobile phase: water/acetonitrile=25/75 (v/v)
Mobile phase flow rate: 1.0 mL/min
Detector: CoronaPlus CAD Detector (manufactured by ESA Biosciences)
Nitrogen gas pressure: 35 psi
Nebulizer: 30° C.

<Analysis of haze>

The Haze value in light transmitted through the cellulose acetate solution was measured. "Haze Meter NDH 2000" (trade name) manufactured by Nippon Denshoku Industries Co., Ltd. was used as a measurement apparatus, and a measurement diameter of 30 mm and a C light source were selected as measurement conditions. To 12 g of dried cellulose acetate were added 8.8 g of methanol and 79.2 g of methylene chloride, the cellulose acetate was dissolved, and the solution was degassed to prepare a cellulose acetate solution. The cellulose acetate solution was added in a glass cell of 45 mm (L)×45 mm (W)×10 mm (D), and the haze value was measured.

<Lump Evaluation>

Light was applied to a surface of a cellulose acetate film, and the number of foreign matters (lumps: spot-like specks) observed per 70 cm² (7 cm (length)×10 cm (width)) was visually evaluated.

Comparative Example 1

Softwood sulfite pulp having an α-cellulose content of 97.8 wt % was crushed into a cotton form with a disc refiner to obtain crushed pulp. 26.8 parts by weight of acetic acid was sprayed to 100 parts by weight of crushed pulp (water content: 8%), and the mixture was thoroughly mixed, and left standing for 60 hours as pretreatment to activate the mixture (activation step).

The activated pulp was added to a mixture including 323 parts by weight acetic acid, 245 parts by weight acetic anhydride and 13.1 parts by weight sulfuric acid. The mixture was cooled to 5° C. in advance. The temperature was adjusted to a maximum temperature of 40° C. from 5° C. over 40 minutes, and acetylation was performed for 90 minutes from the time point at which the pulp was added to the mixture (acetylation step). A neutralizing agent (24% magnesium acetate aqueous solution) was added over 3 minutes so as to adjust the amount of sulfuric acid (the amount of aged sulfuric acid) to 2.5 parts by weight. Further, the reaction bath was heated to 75° C., water was then added, so that the reaction bath moisture (aging moisture) concentration was 52 mol %. The ratio of reaction bath moisture to acetic acid was determined in terms of a molar ratio, and the molar ratio was multiplicated by 100 to determine the aging moisture concentration expressed as mol %. Thereafter, aging was performed at 85° C. for 100 minutes, and aging was stopped by neutralizing sulfuric acid with magnesium acetate to obtain a reaction mixture containing cellulose acetate (aging step).

Dilute acetic acid (10 wt %) was kneaded into the obtained reaction mixture containing cellulose acetate using a twin-screw kneader, and the cellulose acetate was precipitated by a kneading precipitation method. At this time, dilute acetic acid was kneaded into the reaction mixture containing cellulose acetate in three portions. Dilute acetic acid (10 wt %) was kneaded at a ratio (weight ratio) of 0.4 times the amount of the reaction mixture containing cellulose acetate in the first, and after the reaction mixture became uniform, the dilute acetic acid was kneaded at a ratio (weight ratio) of 0.5 times the amount of the reaction mixture in the second, and at a ratio (weight ratio) of 0.6 times the amount of the reaction mixture in the third. Thus, the dilute acetic acid was added at a ratio (weight ratio) of 1.5 times the amount of the reaction mixture in total. Precipitation occurred when the dilute acetic acid (10 wt %) was added at a ratio (weight ratio) of 0.6 times the amount of the reaction mixture in the third.

The precipitated cellulose acetate was washed with water, immersed in a dilute calcium hydroxide aqueous solution (20 ppm), then filtered off, dried, and ground using a Makino grinder (Model: DD-2-3.7 manufactured by Makino Mfg Co., Ltd.). The grinding conditions were set to a rotational speed of 2450 rpm and a screen diameter of φ5.0 mm.

For the obtained cellulose acetate, the acetylation degree, the acetone-insoluble substance content, the viscosity at 6% and the constituent sugar ratio were measured. The results are shown in Table 1.

100 parts by weight of the obtained cellulose acetate and 35 parts by weight of DEP (diethyl phthalate) were mixed by a Henschel mixer, dried at 80° C. for 12 hours, then a twin-screw extruder (cylinder temperature: 200° C., die temperature: 220° C.), and extruded to be pelletized. The pellets were remelted at 230° C. and a film of 200 μm was formed by a single-screw extruder I (model: GT-25A manufactured by Research Laboratory of Plastics Technology Co., Ltd) equipped with T-die having a width of 150 mm. The results of the number of foreign lumps in the obtained film are shown in Table 1.

Comparative Example 2

80 parts by weight of acetone was added to 20 parts by weight of the cellulose acetate obtained in Comparative Example 1, and the mixture was then shaken for 3 hours to completely dissolve the cellulose acetate. 110 parts by weight of distilled water was added to the obtained cellulose acetate solution, and the precipitated cellulose acetate was filtered with a filter paper (Kiriyama Filter Paper No. 5C 40 φ manufactured by Kiriyama glass CO.). 150 parts by weight of distilled water was added to cellulose acetate, and centrifugally dehydrated (rotational speed: 1000 rpm, 3 minutes). Thereafter, drying was performed at 80° C. for 12 hours to obtain cellulose acetate, and was ground using a Makino grinder (Model: DD-2-3.7 manufactured by Makino Mfg Co., Ltd.). The grinding conditions were set to a rotational speed of 2450 rpm and a screen diameter of 0.0 mm.

For the obtained cellulose acetate, the acetylation degree, the acetone-insoluble substance content, the viscosity at 6% and the constituent sugar ratio were measured. The results are shown in Table 1.

100 parts by weight of the obtained cellulose acetate and 35 parts by weight of DEP (diethyl phthalate) were mixed by a Henschel mixer, dried at 80° C. for 12 hours, then a twin-screw extruder (cylinder temperature: 200° C., die temperature: 220° C.), and extruded to be pelletized. The pellets were remelted at 230° C. and a film of 200 μm was formed by a single-screw extruder I (model: GT-25A manufactured by Research Laboratory of Plastics Technology Co., Ltd) equipped with T-die having a width of 150 mm. The results of the number of foreign lumps in the obtained film are shown in Table 1.

Example 1

80 parts by weight of acetone was added to 20 parts by weight of the cellulose acetate obtained in Comparative Example 1, and the mixture was then shaken for 3 hours to completely dissolve the cellulose acetate. The obtained cellulose acetate solution was made to pass through a filter (BEKIPOR 15AL3 manufactured by Kansai Wire Netting Co., Ltd., filtration particle size: 15 μm) under pressure (2 kg/cm$^2$). 110 parts by weight of distilled water was added to the obtained cellulose acetate solution, and the precipitated cellulose acetate was filtered with a filter paper (Kiriyama Filter Paper No. 5C 40 φ manufactured by Kiriyama glass CO.). 150 parts by weight of distilled water was added to cellulose acetate, and centrifugally dehydrated (rotational speed: 1000 mm, 3 minutes). Thereafter, drying was performed at 80° C. for 12 hours to obtain cellulose acetate, and was ground using a Makino grinder (Model: DD-2-3.7 manufactured by Makino Mfg Co., Ltd.). The grinding conditions were set to a rotational speed of 2450 rpm and a screen diameter of φ5.0 mm.

For the obtained cellulose acetate, the acetylation degree, the acetone-insoluble substance content, the viscosity at 6% and the constituent sugar ratio were measured. The results are shown in Table 1.

100 parts by weight of the obtained cellulose acetate and 35 parts by weight of DEP (diethyl phthalate) were mixed by a Henschel mixer, dried at 80° C. for 12 hours, then a twin-screw extruder (cylinder temperature: 200° C., die temperature: 220° C.), and extruded to be pelletized. The pellets were remelted at 230° C. and a film of 200 μm was formed by a single-screw extruder I (model: GT-25A manufactured by Research Laboratory of Plastics Technology Co., Ltd) equipped with T-die having a width of 150 mm. The results of the number of foreign lumps in the obtained film are shown in Table 1.

Example 2

80 parts by weight of dichloromethane and 4 parts by weight of methanol were added to 16 parts by weight of the cellulose acetate obtained in Comparative Example 1, and the mixture was then shaken for 3 hours to completely dissolve the cellulose acetate. The obtained cellulose acetate solution was made to pass through a filter (BEKIPOR 15AL3 manufactured by Kansai Wire Netting Co., Ltd., filtration particle size: 15 μm) under pressure (3 kg/cm$^2$). 289 parts by weight of methanol was added to the obtained cellulose acetate solution, and the precipitated cellulose acetate was filtered with a filter paper (Kiriyama Filter Paper No. 5C 40 φ manufactured by Kiriyama glass CO.). 150 parts by weight of distilled water was added to cellulose acetate, and centrifugally dehydrated (rotational speed: 1000 rpm, 3 minutes). Thereafter, drying was performed at 80° C. for 12 hours to obtain cellulose acetate, and was ground using a Makino grinder (Model: DD-2-3.7 manufactured by Makino Mfg Co., Ltd.). The grinding conditions were set to a rotational speed of 2450 rpm and a screen diameter of 0.0 mm.

For the obtained cellulose acetate, the acetylation degree, the acetone-insoluble substance content, the viscosity at 6% and the constituent sugar ratio were measured. The results are shown in Table 1.

100 parts by weight of the obtained cellulose acetate and 35 parts by weight of DEP (diethyl phthalate) were mixed by a Henschel mixer, dried at 80° C. for 12 hours, then a twin-screw extruder (cylinder temperature: 200° C., die temperature: 220° C.), and extruded to be pelletized. The pellets were remelted at 230° C. and a film of 200 μm was formed by a single-screw extruder I (model: GT-25A manufactured by Research Laboratory of Plastics Technology Co., Ltd) equipped with T-die having a width of 150 mm. The results of the number of foreign lumps in the obtained film are shown in Table 1.

Example 3

Except that softwood sulfite pulp having an α-cellulose content of 97.0 wt % was used, the acetylation time at 85° C. was 100 minutes, and the reaction bath moisture (aging moisture) concentration was 39 mol %, the same procedure as in Comparative Example 1 was carried out to obtain cellulose acetate.

For the obtained cellulose acetate, the acetylation degree, the acetone-insoluble substance content, the viscosity at 6% and the constituent sugar ratio were measured. The results are shown in Table 1.

100 parts by weight of the obtained cellulose acetate and 35 parts by weight of DEP (diethyl phthalate) were mixed by a Henschel mixer, dried at 80° C. for 12 hours, then a twin-screw extruder (cylinder temperature: 200° C., die temperature: 220° C.), and extruded to be pelletized. The pellets were remelted at 230° C. and a film of 200 μm was formed by a single-screw extruder I (model: GT-25A manufactured by Research Laboratory of Plastics Technology Co., Ltd) equipped with T-die having a width of 150 mm. The results of the number of foreign lumps in the obtained film are shown in Table 1.

TABLE 1

| | Cellulose acetate | | | | | | Number of foreign lumps | |
| --- | --- | --- | --- | --- | --- | --- | --- | --- |
| | Acetylation degree (%) | Acetone-insoluble substance content (wt %) | Viscosity at 6% (mPa · s) | Constitutional sugar ratio [mol %] | | | (number/70 cm$^2$) | Haze |
| | | | | Glucose | Xylose | Mannose | | |
| Comparative Example 1 | 55.1 | 0.051 | 113 | 98.49 | 0.66 | 0.85 | 138 | 4 or less |
| Comparative Example 2 | 55.1 | 0.046 | 113 | 98.49 | 0.66 | 0.85 | 139 | 4 or less |

TABLE 1-continued

| | Cellulose acetate | | | | | | Number of foreign lumps | |
|---|---|---|---|---|---|---|---|---|
| | Acetylation degree (%) | Acetone-insoluble substance content (wt %) | Viscosity at 6% (mPa · s) | Constitutional sugar ratio [mol %] | | | (number/70 cm$^2$) | Haze |
| | | | | Glucose | Xylose | Mannose | | |
| Example 1 | 55.1 | 0.020 | 114 | 98.49 | 0.66 | 0.85 | 45 | 4 or less |
| Example 2 | 55.1 | 0.037 | 115 | 98.49 | 0.66 | 0.85 | 63 | 4 or less |
| Example 3 | 55.1 | 0.002 | 56 | 97.65 | 1.47 | 0.88 | 29 | 4 or less |

Comparison of Examples 1 to 3 with Comparative Examples 1 and 2 showed that the film formed from cellulose acetate having an acetone-insoluble substance content of 0.04 wt % or less was a high-quality film having a small number of foreign lumps and an extremely small amount of foreign matter.

The invention claimed is:

1. A cellulose acetate having an acetylation degree of 52% or more and 59% or less, and an acetone-insoluble substance content of 0.04 wt % or less,
    wherein the cellulose acetate has a ratio of a molar content of glucose to a sum of molar contents of glucose, xylose and mannose is 98.0% or more in sugar composition analysis,
    when the acetone-insoluble substance content is measured by steps of:
    dissolving cellulose acetate in acetone at a solid concentration of 3 wt % to obtain a solution;
    filtering the solution by suction filtration at room temperature of 25° C. under a reduced pressure of 30 mmHg using a glass filter having a pore diameter of 5 to 10 μm to obtain filtration residue;
    washing a dope adhering to the filtration residue with acetone;
    drying the filtration residue and the glass filter,
    wherein the glass filter is weighed before and after filtering,
    wherein the acetone-insoluble substance content is calculated as:
    acetone-insoluble substance content (wt %)=[weight of glass filter after filtration (g)−weight of filter before filtration (g)]/weight of cellulose acetate (g)×100.

2. The cellulose acetate according to claim 1, wherein a viscosity of the cellulose acetate at 6 wt % cellulose acetate per volume of acetone solution is 30 mPa·s or more and 200 mPa·s or less.

3. A cellulose acetate composition comprising the cellulose acetate according to claim 1 or 2 and a plasticizer.

4. A molded article comprising the cellulose acetate according to claim 1 or 2.

5. A film comprising the cellulose acetate according to claim 1 or 2.

* * * * *